United States Patent
Agnew et al.

(10) Patent No.: US 9,343,769 B2
(45) Date of Patent: May 17, 2016

(54) FUEL CELL AND A METHOD OF MANUFACTURING A FUEL CELL

(71) Applicant: LG FUEL CELL SYSTEMS INC, North Canton, OH (US)

(72) Inventors: Gerard D. Agnew, Derby (GB); Peter J Dixon, Derby (GB)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 142 days.

(21) Appl. No.: 14/220,536

(22) Filed: Mar. 20, 2014

(65) Prior Publication Data

US 2014/0205933 A1 Jul. 24, 2014

Related U.S. Application Data

(62) Division of application No. 12/669,883, filed as application No. PCT/GB2008/002369 on Jul. 10, 2008, now Pat. No. 8,715,885.

(30) Foreign Application Priority Data

Aug. 3, 2007 (GB) .................................. 0715225.9

(51) Int. Cl.
*H01M 4/02* (2006.01)
*H01M 8/10* (2016.01)
(Continued)

(52) U.S. Cl.
CPC .......... *H01M 8/1004* (2013.01); *H01M 4/8626* (2013.01); *H01M 8/1213* (2013.01); *H01M 8/2425* (2013.01); *H01M 4/881* (2013.01);
(Continued)

(58) Field of Classification Search
CPC ............ H01M 8/1004; H01M 8/8626; H01M 8/1213; H01M 8/2425; H01M 4/881; H01M 4/8828; H01M 4/9066; H01M 2008/1293; H01M 4/8835; Y02E 60/521; Y02E 60/525
See application file for complete search history.

(56) References Cited

U.S. PATENT DOCUMENTS 5,549,983 A 8/1996 Yamanis
6,841,290 B2 1/2005 Klitsner et al.
(Continued)

FOREIGN PATENT DOCUMENTS

CA 2 455 819 A1 2/2003
CA 2 554 160 A1 9/2005
(Continued)

OTHER PUBLICATIONS

British Search Report issued in British Application No. 0715225.9 dated Aug. 28, 2007.
(Continued)

*Primary Examiner* — Raymond Alejandro
(74) *Attorney, Agent, or Firm* — Oliff PLC

(57) ABSTRACT

A method of manufacturing a fuel cell, more particularly a method of manufacturing a ceramic fuel cell and in particular a method of manufacturing a solid oxide fuel cell, is described herein. The method includes forming at least one sheet of electrolyte material, depositing anode electrode and cathode material on the electrolyte material, forming apertures through the electrolyte material, arranging the electrolyte material in a stack, dividing the electrolyte material into pieces, depositing additional electrode material on the surfaces of the pieces, and depositing additional electrode material on the surface of the apertures of the pieces in order to form a fuel cell.

6 Claims, 6 Drawing Sheets

(51) Int. Cl.
*H01M 4/86* (2006.01)
*H01M 8/12* (2016.01)
*H01M 8/24* (2016.01)
*H01M 4/88* (2006.01)
*H01M 4/90* (2006.01)

(52) U.S. Cl.
CPC ........... *H01M 4/8828* (2013.01); *H01M 4/8835* (2013.01); *H01M 4/9066* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 2003/0082446 A1 | 5/2003 | Chiang et al. | |
| 2003/0198860 A1* | 10/2003 | Yasumoto | H01M 4/8605 429/492 |
| 2004/0062973 A1 | 4/2004 | Agnew et al. | |
| 2004/0081875 A1 | 4/2004 | Milliken et al. | |
| 2004/0121217 A1 | 6/2004 | Herman et al. | |
| 2004/0166390 A1 | 8/2004 | Agnew et al. | |
| 2005/0260461 A1 | 11/2005 | Wood et al. | |
| 2006/0105227 A1* | 5/2006 | Kim | H01M 4/8605 429/483 |
| 2007/0141445 A1 | 6/2007 | Hertz et al. | |
| 2007/0269698 A1* | 11/2007 | Gu | H01M 4/8642 429/483 |
| 2008/0206616 A1* | 8/2008 | Atanassova | C09D 11/30 429/479 |
| 2009/0104496 A1 | 4/2009 | Christensen et al. | |
| 2009/0162723 A1 | 6/2009 | Zhan | |

FOREIGN PATENT DOCUMENTS

| | | |
|---|---|---|
| DE | 20 2006 002 731 U1 | 9/2006 |
| DE | 10 2008 018 941 A1 | 10/2009 |
| JP | A-2001-319665 | 11/2001 |
| WO | WO 2005/008816 A2 | 1/2005 |
| WO | WO 2006/053422 A1 | 5/2006 |
| WO | WO 2007/010207 A1 | 1/2007 |

OTHER PUBLICATIONS

Written Opinion of the International Searching Authority issued in International Application No. PCT/GB2008/002369 dated Nov. 13, 2008.
International Search Report issued in International Application No. PCT/GB2008/002369 dated Nov. 13, 2008.
Office Action issued in Japanese Patent Application No. 2010-518727 dated Feb. 5, 2013.

* cited by examiner

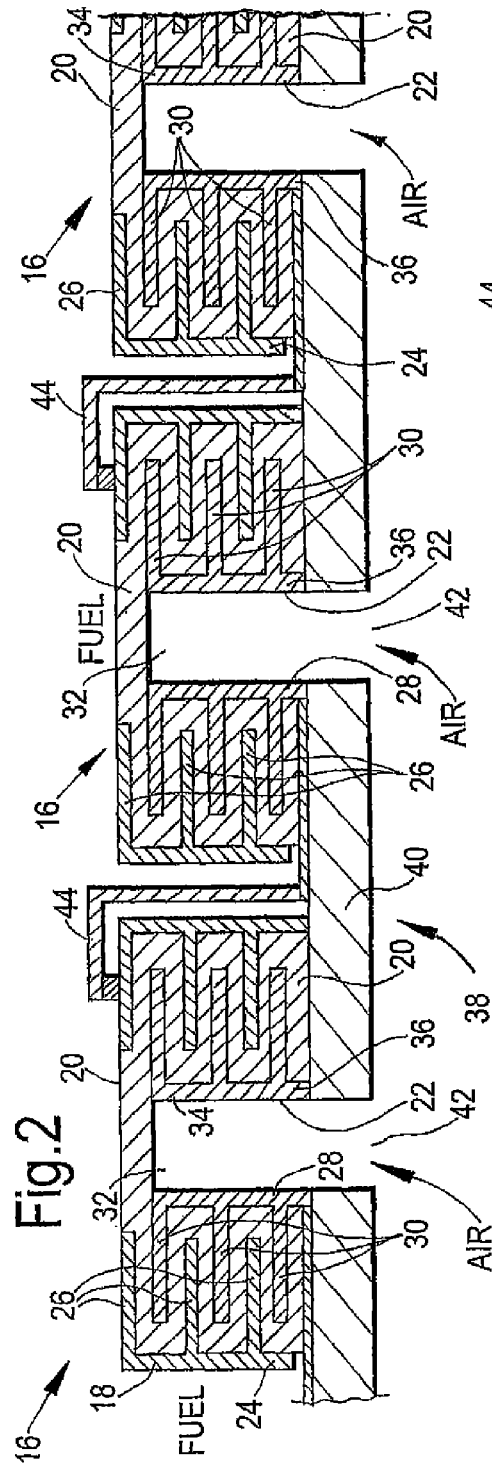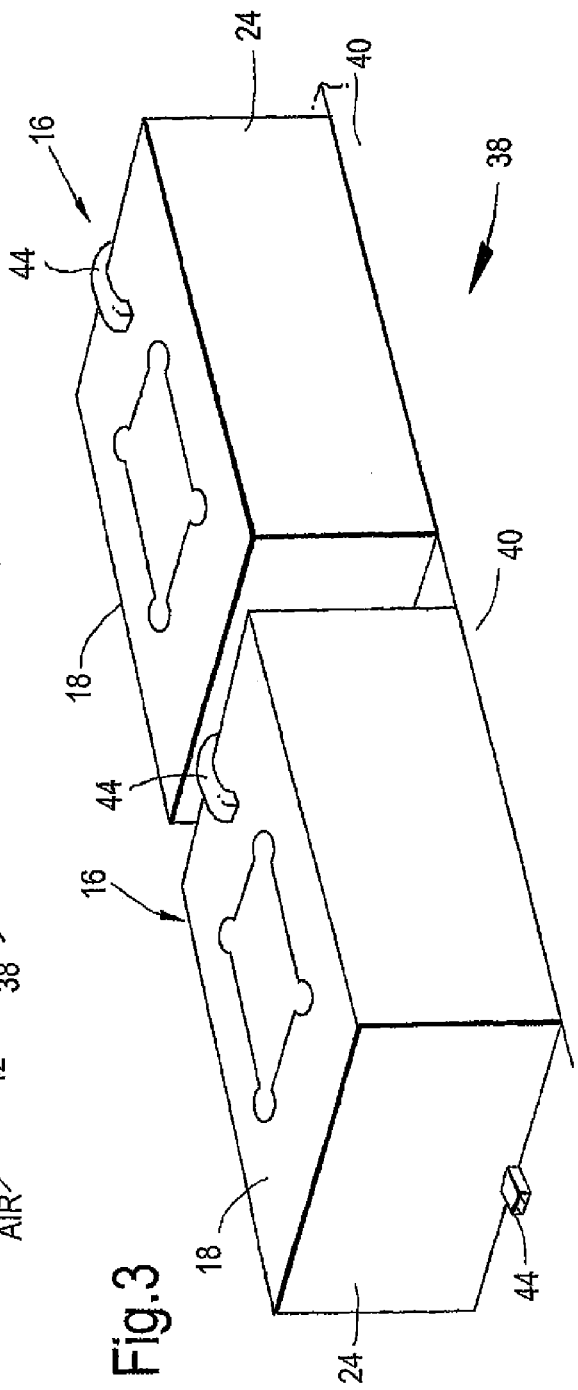

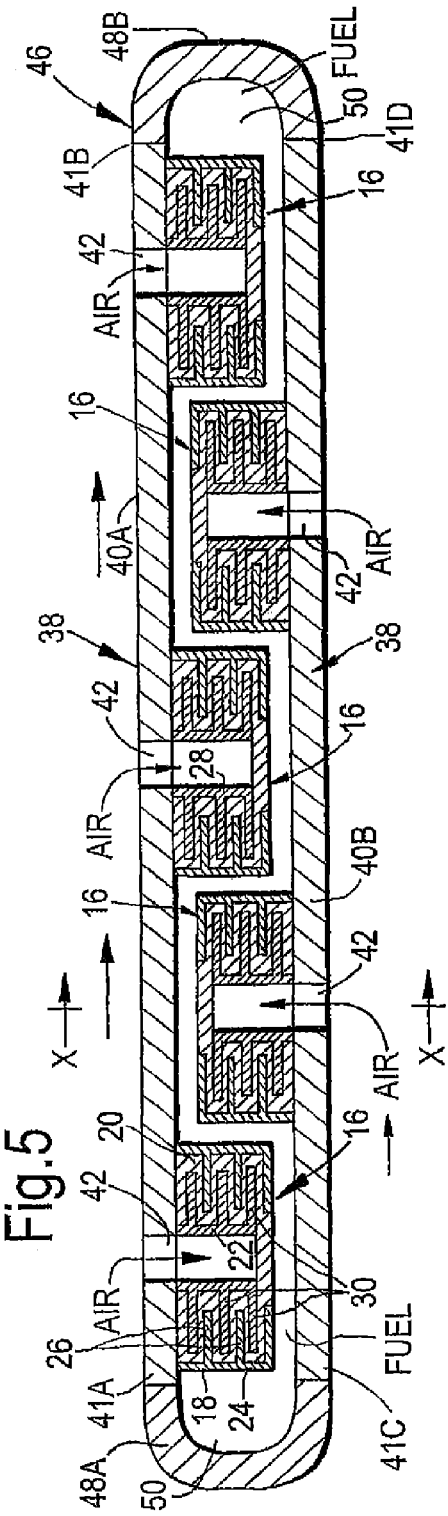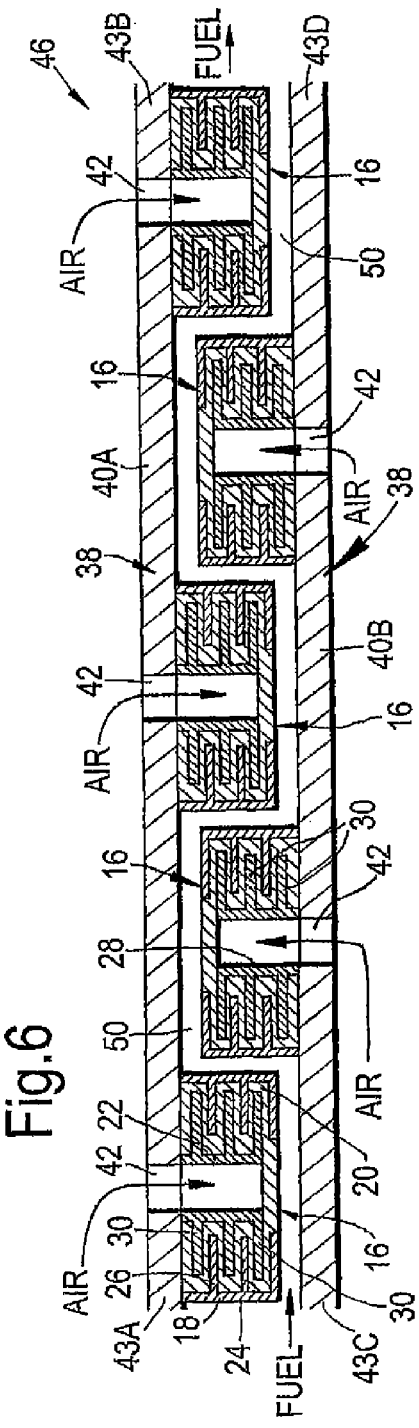

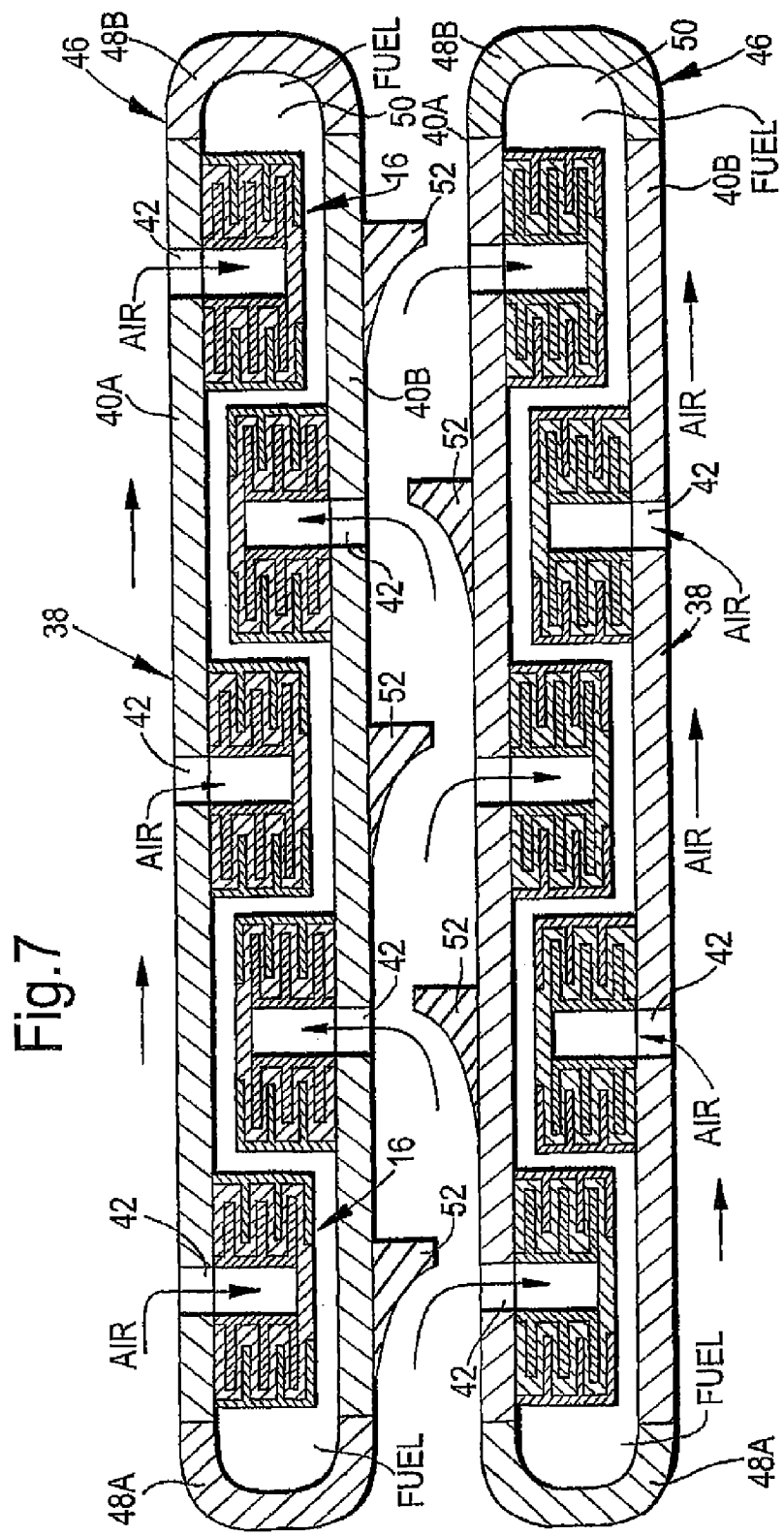

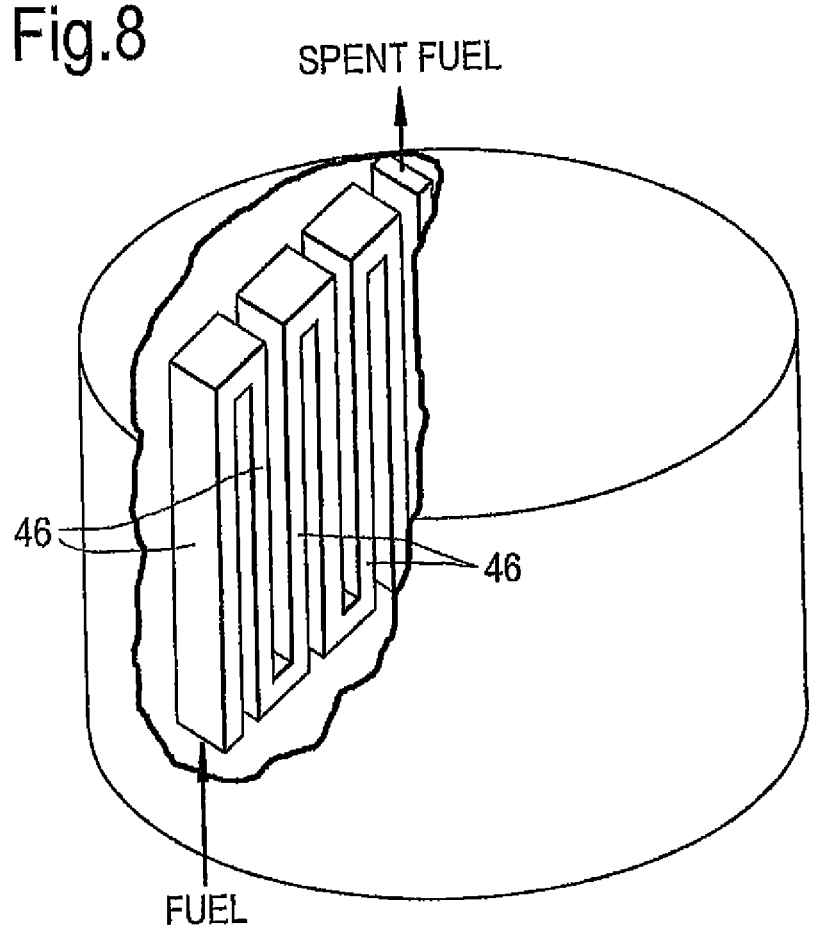

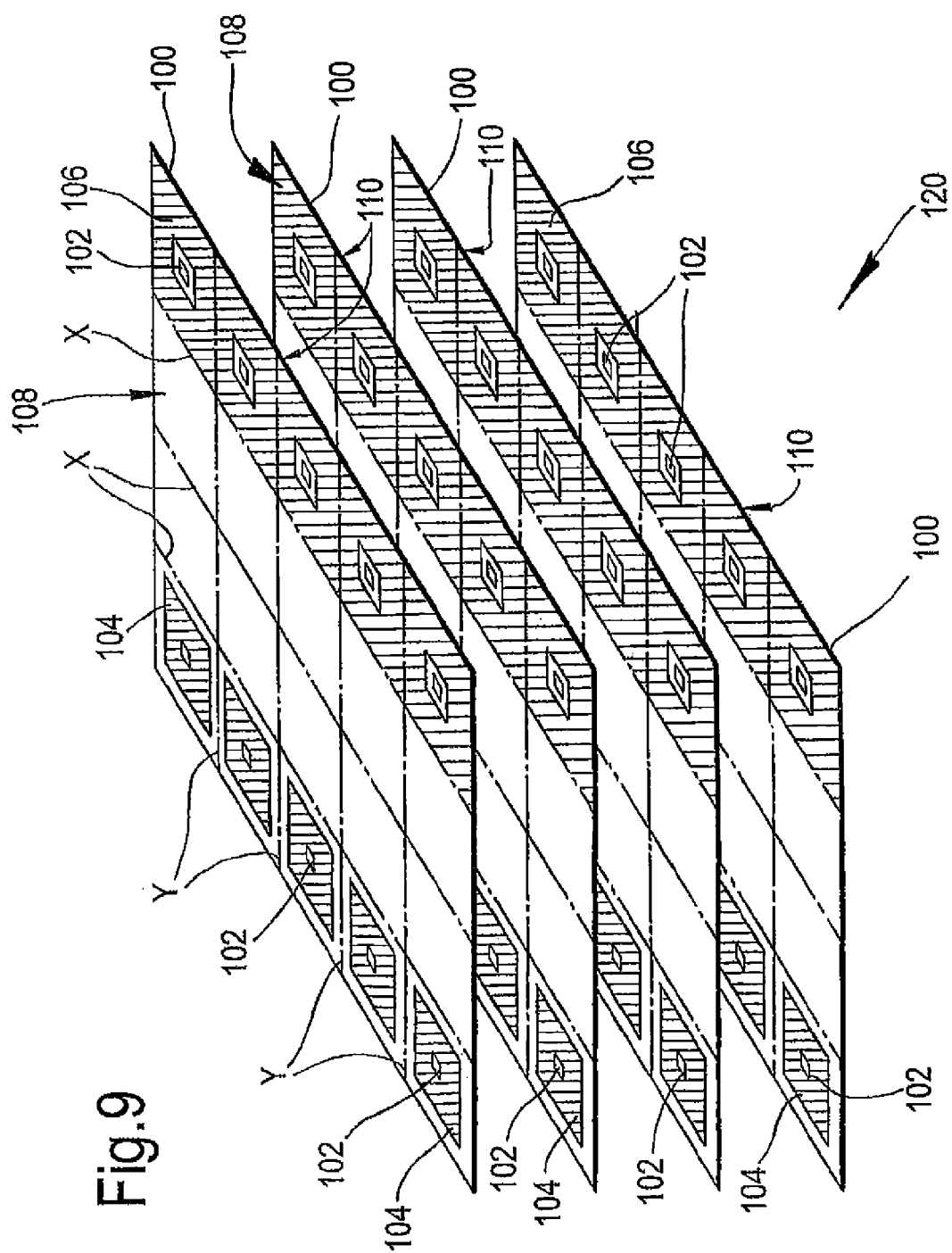

FUEL CELL AND A METHOD OF MANUFACTURING A FUEL CELL

CROSS-REFERENCE TO RELATED APPLICATIONS

This is a Division of application Ser. No. 12/669,883 filed Jan. 20, 2010 (now U.S. Pat. No. 8,715,885, issued May 6, 2014), which in turn is a National Stage of International Application PCT/GB2008/002369, filed Jul. 10, 2008, which claims the benefit of British Patent Application No. GB 0715225.9 filed Aug. 3, 2007. The disclosure of the prior applications is hereby incorporated by reference herein in its entirety.

SUMMARY

The present invention relates to a fuel cell, more particularly to a ceramic fuel cell and in particular to a solid oxide fuel cell and also relates to a method of manufacturing a fuel cell, more particularly to a method of manufacturing a ceramic fuel cell and in particular to a method of manufacturing a solid oxide fuel cell.

One type of solid oxide fuel cell is the tubular solid oxide fuel cell in which solid oxide fuel cells are arranged electrically, and physically, in series axially along the cylindrical surface of a hollow tubular member.

A further type of solid oxide fuel cell is the planar solid oxide fuel cell in which solid oxide fuel cells are arranged electrically, and physically, in series longitudinally along the flat surfaces of a hollow flat member.

Another type of solid oxide fuel cell is the monolithic solid oxide fuel cell in which anode plates electrolyte plates, cathode plates and interconnector plates are stacked sequentially.

Accordingly the present invention seeks to provide a novel fuel cell.

Accordingly the present invention provides a fuel cell comprising a porous anode electrode, a dense non-porous electrolyte and a porous cathode electrode, the anode electrode comprising a first member and a plurality of parallel plate members extending from the first member, the cathode electrode comprising a second member and a plurality of parallel plate members extending from the second member, the plate members of the cathode electrode inter-digitating with the plate members of the anode electrode, the electrolyte filling the spaces between the first member and second member and between the parallel plate members of the anode electrode and the parallel plate members of the cathode electrode.

Preferably the fuel cell is a ceramic fuel cell, more preferably the fuel cell is a solid oxide fuel cell. Preferably the electrolyte comprises zirconia. Preferably the electrolyte comprising yttria stabilised zirconia.

Preferably the first member forms a conduit for the flow of a fuel. Preferably a first end of the first member is sealed by an end cap or electrolyte. Alternatively the second member forms a conduit for the flow of an oxidant. Alternatively a first end of the second member is sealed by an end cap or an electrolyte.

Preferably the first member is substantially circular, rectangular, square or hexagonal in cross-section. Preferably the second member is substantially circular, rectangular, square or hexagonal in cross-section.

Preferably the plate members of the first member are substantially circular, rectangular, square or hexagonal in shape. Preferably the plate members of the second member are substantially circular, rectangular, square or hexagonal in shape.

Preferably the fuel cell is arranged on a dense non-porous member and the dense non-porous member has an aperture to supply fuel to the first member.

Preferably the fuel cell is arranged on a dense non-porous member and the dense non-porous member has an aperture to supply oxidant to the second member.

Preferably the fuel cell is arranged on a dense non-porous tube and the dense non-porous tube has an aperture to supply fuel to the first member.

Preferably the fuel cell is arranged on a dense non-porous tube and the dense non-porous tube has an aperture to supply oxidant to the second member.

Preferably the fuel cell is arranged on a dense non-porous plate and the dense non-porous plate has an aperture to supply fuel to the first member.

Preferably the fuel cell is arranged on a dense non-porous plate and the dense non-porous plate has an aperture to supply oxidant to the second member.

The present invention also provides a fuel cell stack comprising a plurality of the fuel cells, mentioned in the preceding paragraphs, electrically connected in series.

Preferably the fuel cell stack comprises a first dense non-porous plate and a second dense non-porous plate, the first dense non-porous plate has a plurality of apertures to supply oxidant to the second member of a respective one of a plurality of fuel cells, the second dense non-porous plate has a plurality of apertures to supply oxidant to the second member of a respective one of a plurality of fuel cells, the first and second dense non-porous plates are arranged with the fuel cells therebetween to form a passage for supply of a fuel to the first members of the fuel cells.

Preferably the fuel cells on the first and second dense non-porous plates are arranged in predetermined patterns. Preferably the fuel cells on the first dense non-porous plate are arranged alternately with fuel cells on the second dense non-porous plate.

The present invention also provides a method of manufacturing a fuel cell comprising forming a plurality of sheets of electrolyte material, depositing anode electrode material on a first surface of each sheet of electrolyte material and depositing cathode material on a second surface of each sheet of electrolyte material, forming a plurality of apertures through each sheet of electrolyte material, arranging the sheets of electrolyte material in a stack such that anode electrode material of adjacent sheets of electrolyte material face each other and the cathode electrode material of adjacent sheets of electrolyte material face each other and the apertures in the sheets of electrolyte material are aligned, dividing the stack into a plurality of pieces such that an aperture extends into each piece, depositing further electrode material on the outer surfaces of each piece and depositing further electrode material on the surface of the aperture of each piece to form a fuel cell.

Preferably the method comprises forming a plurality of apertures through each sheet of electrolyte material before depositing anode electrode material on a first surface of each sheet of electrolyte material and depositing cathode material on a second surface of each sheet of electrolyte material.

Alternatively the method comprises depositing anode electrode material on a first surface of each sheet of electrolyte material and depositing cathode material on a second surface of each sheet of electrolyte material before forming a plurality of apertures through each sheet of electrolyte material.

The present invention also provides a method of manufacturing a fuel cell comprising forming at least one sheet of electrolyte material, depositing anode electrode material on a first surface of each sheet of electrolyte material and depositing cathode material on a second surface of each sheet of electrolyte material, forming a plurality of apertures through each sheet of electrolyte material, dividing the stack into a plurality of pieces such that an aperture extends through each piece, arranging the pieces of electrolyte material in a stack such that anode electrode material of adjacent pieces of electrolyte material face each other and the cathode electrode material of adjacent pieces of electrolyte material face each other and the apertures in the pieces of electrolyte material are aligned, depositing further electrode material on the outer surfaces of each piece and depositing further electrode material on the surface of the aperture of each piece to form a solid oxide fuel cell.

BRIEF DESCRIPTION OF THE DRAWINGS

The present invention will be more fully described by way of example with reference to the accompanying drawings in which:

FIG. 2 is an enlarged cross-sectional view though a portion of a fuel cell assembly having a plurality of fuel cells according to the present invention.

FIG. 3 shows is a perspective view of a portion of the fuel cell assembly having a plurality of fuel cells according to the present invention.

FIG. 5 is a cross-sectional view of a portion of a fuel cell module comprising two fuel cell assemblies having a plurality of fuel cells according to the present invention.

FIG. 6 is cross-sectional view in the direction X-X through the fuel cell module shown in FIG. 5.

FIG. 7 is a cross-sectional view of a portion of two adjacent fuel cell modules comprising two fuel cell assemblies having a plurality of fuel cells according to the present invention.

FIG. 8 is a partially cut-away perspective view of a further fuel cell stack having a plurality of fuel cells according to the present invention.

FIG. 9 is an exploded perspective view of a stack of sheets of electrolyte material during the manufacture of fuel cells according to the present invention.

DETAILED DESCRIPTION

Figure 1:
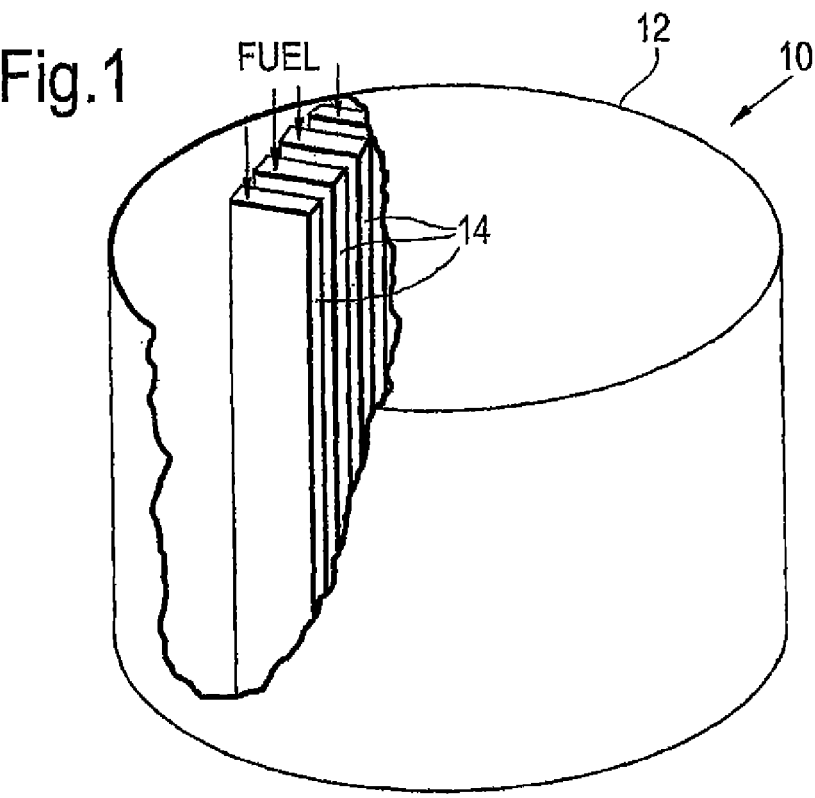
FIG. 1 is a partially cut-away perspective view of a fuel cell stack having a plurality of fuel cells according to the present invention.

A solid oxide fuel cell stack 10, as shown in FIG. 1, comprises a plurality of solid oxide fuel cell modules 14 arranged within a casing 12. Each solid oxide fuel cell module 14 comprises a plurality of solid oxide fuel cells 16.

Figure 4:
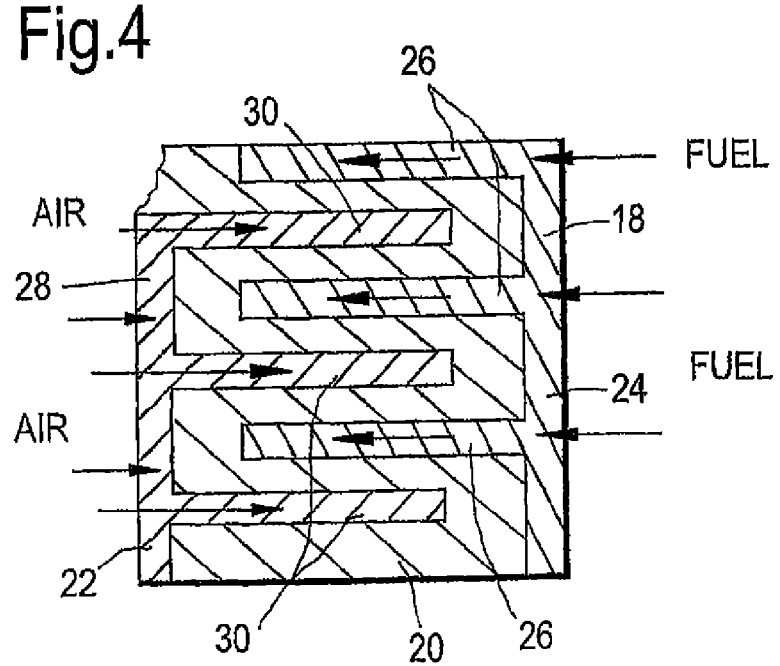
FIG. 4 is a further enlarged cross-sectional view through a portion of a fuel cell shown in FIG. 2.

Each solid oxide fuel cell 16, as shown more clearly in FIGS. 2, 3 and 4 comprises a porous anode electrode 18, a dense non-porous electrolyte 20 and a porous cathode electrode 22. The anode electrode 18 comprises a first member 24 and a plurality of parallel plate members 26 extending from the first member 24. Similarly the cathode electrode 22 comprises a second member 28 and a plurality of parallel plate members 30 extending from the second member 28. The plate members 30 of the cathode electrode 22 inter-digitate with the plate members 26 of the anode electrode 18. The dense non-porous electrolyte 20 fills the spaces between the first members 24 and the second members 28 and between the parallel plate members 26 of the anode electrode 18 and the parallel plate members 30 of the cathode electrode 22. The first member 24 and the parallel plates 26 and the second member 28 and the parallel plates 30 are gas permeable/gas porous.

In the arrangement shown in FIGS. 2 and 3 the second member 22 forms a conduit 32 for the flow of an oxidant, e.g. oxygen or air. A first end 34 of the second member 28 is sealed by the electrolyte 20, in this case the electrolyte 20 is arranged to extend across the first end 34 of the second member 28. Alternatively an end cap may be provided to close and seal the first end 34 of the second member 28. The second end 36 of the second member 28 is open to allow a flow of oxidant, oxygen or air, into the conduit 32 within the second member 28.

The first member 24 and the second member 28 are hollow tubes and are substantially rectangular in cross-section and the first member 24 is positioned around the second member 28 and the parallel plate members 26 extend from the first member 24 towards the second member 28 and the parallel plate members 30 extend from the second member 28 towards the first member 24 and oxidant is supplied into the second member 28 and fuel is supplied around the first member 24. Similarly the plate members 26 of the first member 24 are substantially rectangular in shape and the plate members 30 of the second member 28 are rectangular in shape.

The parallel plate members 26 of the anode electrode 18, the parallel plate members 30 of the cathode electrode 22 and the electrolyte members 23 are provided with aligned apertures, within which the second member 28 is positioned to form the conduit 32 for the flow of the oxidant.

Alternatively the first member 24 may be substantially circular, hexagonal, triangular, square or other suitable shape in cross-section and the second member 28 may be substantially circular, hexagonal, triangular, square or other suitable shape in cross-section and may have the same shape as the first member 24. Alternatively the plate members 26 of the first member 24 may be circular, hexagonal, triangular, square or other suitable shape and the plate members 30 of the second member 28 may be circular, hexagonal, triangular, square or other suitable shape.

A plurality of the solid oxide fuel cells 16 are arranged in a solid oxide fuel cell assembly 38 and in particular the solid oxide fuel cells 16 are arranged on a dense non-porous member 40 and the dense non-porous member 40 has a plurality of apertures 42 and each aperture 42 is aligned with the second member 28 of a corresponding one of the solid oxide fuel cells 16 and is arranged to supply oxidant to the conduit 32 within the second member 28 of the corresponding one of the solid oxide fuel cells 16. Each solid oxide fuel cell 16 is bonded and sealed to the dense non-porous member 40 in a gas tight fashion to prevent oxidant leaking to the fuel and visa-versa.

One or more electrical interconnectors 44 are provided to interconnect the first member 24 of the anode electrode 18 of one solid oxide fuel cell 16 with the second member 28 of the cathode electrode 22 of an adjacent solid oxide fuel cell 16, as shown in FIGS. 2 and 3.

Generally two of these solid oxide fuel cell assemblies 38 are provided to form a solid oxide fuel cell module 46, as shown in FIGS. 5 and 6. The solid oxide fuel cell module 46 comprises a first dense non-porous plate 40A and a second dense non-porous plate 40B. The first dense non-porous plate 40A has a plurality of apertures 42 to supply oxidant to the second members 28 of a respective one of a plurality of solid oxide fuel cells 16. The second dense non-porous plate 40B has a plurality of apertures 42 to supply oxidant to the second members 28 of a respective one of a plurality of solid oxide fuel cells 16. The first and second dense non-porous plates 40A and 40B are arranged substantially parallel with the solid oxide fuel cells 16 positioned therebetween to form a passage 50 for the supply of a fuel to the first members 24 of the solid oxide fuel cells 16. There are provided two edge members 48A, 48B. Edge member 48A is bonded and sealed to the first edges 41A and 41C of the first dense non-porous plate 40A and the second dense non-porous plate 40B respectively. Similarly edge member 48B is bonded and sealed to the second edges 41B and 41D of the first dense non-porous plate 40A and the second dense non-porous plate 40B respectively. The gap between the first ends 43A and 43C of the first dense non-porous plate 40A and the second dense non-porous plate 40B respectively is open to allow the supply of fuel into the passage 50 and the gap between the second ends 43B and 43D of the first dense non-porous plate 40A and the second dense non-porous plate 40B is open to allow the removal of fuel from the passage 50. Thus, the first and second dense non-porous plates 40A and 40B and the edge members 48A and 48B form a tube.

The solid oxide fuel cells 16 on the first and second dense non-porous plates 40A and 40B are arranged in predetermined patterns, and in this example the solid oxide fuel cells 16 on the first dense non-porous plate 40A are arranged alternately with the solid oxide fuel cells 16 on the second dense non-porous plate 40B in a direction between the edges of the plates 40A and 40B and also in a direction between the ends of the plates 40A and 40B. A square pattern has been described, but other patterns may be used, such as hexagonal or octagonal patterns.

In operation fuel, hydrogen, is supplied to the passage 50 within the solid oxide fuel cell modules 46 and the fuel, hydrogen, contacts the first members 24 of the anode electrodes 18 and oxidant, oxygen or air, is supplied over the outer surfaces of the solid oxide fuel cell modules 46 and the oxidant, oxygen or air, flows through the apertures 42 in the first and second non-porous plates 40A and 40B into the conduits 32 and contacts the second members 28 of the cathode electrodes 22.

The fuel initially diffuses into the first members 24 of the anode electrodes 18 of the solid oxide fuel cells 16 and then diffuses from the first members 24 into the parallel members 26 of the anode electrodes 18 of the solid oxide fuel cells 16. Similarly the oxidant initially diffuses into the second members 28 of the cathode electrodes 22 of the solid oxide fuel cells 16 and then diffuses from the second members 28 into the parallel members 30 of the cathode electrodes 22 of the solid oxide fuel cells 16. The electrolyte 20 in each solid oxide fuel cell 16 closes the respective conduit 32 and prevents the mixing of the fuel and the oxidant.

The parallel plates 26 of each anode electrode 18 and the parallel plates 30 of each cathode electrode 22 are connected electrically in parallel to form a single solid oxide fuel cell 16. The electrolyte 20 of each solid oxide fuel cell 16 is positioned between and contacts all the surfaces of the parallel plates 26 of the anode electrode 18 and contacts all the surfaces of the parallel plates 30 of the cathode electrode 22 such that there are no spaces between the electrolyte 20 and the parallel plates 26 and there are no spaces between the electrolyte 20 and the parallel plates 30. Thus, fuel only flows by diffusion in the porous parallel plates 26 and oxidant only flows by diffusion in the porous parallel plates 30.

Heat is transferred from the solid oxide fuel cells 16 by heat conduction through the parallel plates 26 and 28 and then heat is transferred partly conductively and partly convectively from the first members 24 to the fuel and from the second members 28 to the oxidant.

In this arrangement the oxidant flows into the apertures 42 by virtue of a flow bubble.

FIG. 7 shows two solid oxide fuel cell modules 46 arranged substantially parallel to each other in a solid oxide fuel cell stack. In this arrangement the plates 40A and 40B of the solid oxide fuel cell modules 46 are provided with a plurality of upstanding members 52. The upstanding members 52 on plate 40A of one solid oxide fuel cell module 46 are positioned in alignment with a respective one of the apertures 42 in the plate 40B of an adjacent solid oxide fuel cell module 46 to direct oxidant, oxygen or air, into the apertures 42 and similarly the upstanding members 52 on the plate 40B of one solid oxide fuel cell modules 46 are positioned in alignment with a respective one of the apertures 42 in the plate 40A of an adjacent solid oxide fuel cell module 46 to direct oxidant, oxygen or air, into the apertures 42.

The solid oxide fuel cell modules 46 may be arranged such that the one end of each solid oxide fuel cell module 46 is connected to a fuel supply manifold and the other end of each solid oxide fuel cell module 46 is connected to a spent fuel manifold as shown in FIG. 1.

The solid oxide fuel cell modules 46 may be arranged such that a first end of one of the solid oxide fuel cell modules 46 is connected to a fuel supply manifold and the second end of one of the solid oxide fuel cell modules 46 is connected to a spent fuel manifold and the remainder of the solid oxide fuel cell modules 46 are arranged such that the first end of the solid oxide fuel cell module 46 is connected to the second end of an adjacent solid oxide fuel cell module 46 such that the fuel supplies sequentially through all the solid oxide fuel cell modules 46 as shown in FIG. 8.

The electrolyte 20 comprises zirconia, preferably yttria stabilised zirconia, but other suitable materials may be used.

The anode electrode 18 comprises for example nickel doped yttria stabilised zirconia (Ni-YSZ), but other suitable materials may be used.

The cathode electrode 22 comprises for example strontium doped lanthanum manganite (LSM), but other suitable materials may be used.

As an example a single solid oxide fuel cell according to the present invention has a length of 6 mm, a width of 3 mm and a thickness of 2 mm.

The first member forms a conduit for the flow of a fuel. Preferably a first end of the first member is sealed by an end cap or electrolyte.

Although the present invention has been described with reference to a solid oxide fuel cell arranged on the dense non-porous tube and the dense non-porous tube having an aperture to supply fuel to the second member, it may be equally possible for the solid oxide fuel cell to be arranged on the dense non-porous tube and the dense non-porous tube having an aperture to supply fuel to the first member.

It may be possible to provide an arrangement of the fuel cell in which the first member and the second member are hollow tubes and the second member is positioned around the first member and the parallel plate members extend from the first member towards the second member and the parallel plate members extend from the second member towards the first member and fuel is supplied into the first member and oxidant is supplied around the second member.

Although the present invention has been described with reference to a solid oxide fuel cell arranged on a dense non-porous plate and the dense non-porous plate having an aperture to supply oxidant to the second member, it may be equally possible for a solid oxide fuel cell to be arranged on a dense non-porous plate and the dense non-porous plate having an aperture to supply fuel to the first member.

Although the present invention has been described with reference to solid oxide fuel cells, it may equally well be applicable to other ceramic fuel cells, other types of fuel cells or solid oxide electrolysis cells.

An advantage of the present invention is that it allows a much reduced scale for the sub unit and a much reduced fuel cell pitch without waste.

The reduced fuel cell pitch together with locally parallel current collectors enables potential use of much higher resistivity current collector materials. Also permits the use of materials only considered suitable as electrode materials to be used for lateral current collectors either as separate layers of the electrodes or within the electrodes.

The present invention provides a multiple layer ceramic fuel cell, e.g. a multiple layer solid oxide fuel cell.

Although the present invention has been described with a single aperture to supply oxidant, or fuel, to each solid oxide fuel cell, it may be possible to provide more than one aperture to supply oxidant, or fuel, to each solid oxide fuel cell. The use of more than one aperture may be necessary if the solid oxide fuel cells are large. However, coefficient of thermal expansion matching and conductive cooling will limit the size of the solid oxide fuel cells. For example the solid oxide fuel cells will have dimensions of up to 30 mm length, 30 mm width and 30 mm height.

Although the present invention has been described with reference to the conduit in the solid oxide fuel cell being defined by the second member of the cathode electrode it may be equally possible for the second member of the cathode electrode merely to electrically interconnect the parallel plates of the cathode electrode in electrical parallel and for the conduit to be defined by edges of the parallel plates of the cathode electrode and the edges of the non-porous electrolyte.

Additionally although the present invention has been described with reference to the conduit in the solid oxide fuel cell being defined by the first member of the anode electrode it may be equally possible for the first member of the cathode electrode merely to electrically interconnect the parallel plates of the cathode electrode in electrical parallel and for the conduit to be defined by edges of the parallel plates of the anode electrode and the edges of the non-porous electrolyte.

The solid oxide fuel cell is manufactured, as shown in FIG. 9, by forming a plurality of thin sheets/plates of dense non-porous electrolyte material 100 by tape casting, or dry rolling, a powder preparation of the electrolyte material, such as yttria stabilised zirconia in a binder. Each sheet/plate of the electrolyte material is dried in the case of tape casting. The binder is removed from the electrolyte material and the electrolyte material is sintered at a high temperature, for example 1000° C. to 1600° C., to form a thin continuous dense non porous sheet/plate of dense non-porous electrolyte of thickness 3 µm to 300 µm.

A plurality of apertures 102 are formed through each dense non-porous sheet/plate of electrolyte 100. The apertures 102 in each sheet/plate of electrolyte material 100 are preferably formed in a rectangular pattern. The apertures may be square, rectangular, hexagonal or circular in cross-section.

The anode electrode material 104 is deposited onto one surface 108 of each sheet/plate of electrolyte material 100 and the cathode electrode material 106 is deposited onto the oppositely facing surface 110 of the respective sheet/plate of electrolyte material 100 using screen printing or stencil printing or other suitable method. The left hand side of the top sheet/plate of electrolyte material 100 shows the anode electrode material 104 on the surface 108 and the right hand side of the top sheet of electrolyte material 100 shows the cathode electrode material 106 on the surface 110. Usually one of the electrode materials is a precursor material so that both electrode materials may be processed in a single furnace environment.

For example the anode electrode material is deposited in an oxidising atmosphere compatible precursor form such as NiO-YSZ in the case of forming Ni-YSZ anode electrodes. The anode electrode material may be processed in the same oxidising furnace environment as the cathode electrode material, such as LSM.

Alternatively, it is possible to use a cathode material precursor capable of withstanding firing in a reducing atmosphere.

It may be possible to use an anode material capable of withstanding reducing and oxidising environments and in this case all processing may be performed without the need for precursor materials.

The electrodes may be enhanced by additional over printing or infiltration of current collector material, such as binary or ternary alloys platinum, palladium, nickel, silver, gold or copper to form a current collector layer. Each current collector layer may be printed and dried, have the binder removed and then sintered or the current collector layer may be co-sintered with the other layers.

The electrodes are deposited in a predetermined pattern on each sheet/plate of electrolyte material, with the anode electrodes deposited on one surface of each sheet/plate of electrolyte material and the cathode electrodes deposited on the opposite surface of each sheet/plate of electrolyte material. The anode electrode material 104 is deposited around each of the apertures 102, e.g. centred on each aperture 102, and extends a predetermined distance from each aperture 102, and thus the anode electrode material is deposited at discrete separated positions on the surface 108. For example the anode electrode material 104 may be deposited in a rectangle or a square around a rectangular, or square, cross-section aperture 102. The cathode electrode material 106 is deposited such that it is spaced a predetermined distance from each of the apertures 102, but otherwise covers the whole of that surface 110 of the sheet/plate of electrolyte material 100. For example the cathode electrode material 106 may be deposited as a sheet with rectangular, or square, shaped apertures with larger dimensions than rectangular, or square, shaped apertures 102 in the sheet of electrolyte material 100.

A plurality of the sheets of the electrolyte material 100 are arranged in a stack 120 such that the apertures 102 in all of the sheets of electrolyte material 100 are aligned. In addition adjacent sheets of the electrolyte material in the stack are arranged such that they are mirror images of each other with respect to a plane between them. Thus, the sheets of electrolyte material are arranged such that the anode electrodes of adjacent sheets of electrolyte material face each other and the cathode electrodes of adjacent sheets of electrolyte material face each other.

The thickness of the electrode material deposited onto the electrolyte material sheet/plate may be half the required thickness for an electrode such that when sheets of electrolyte material are stacked together in the rectangular stack the sheets of the electrolyte material are arranged such that the sequence of the layers is reversed in adjacent sheets of the electrolyte material. Thus, it may be possible to stack up to 400 sheets of electrolyte material, for example 2 to 50 sheets of electrolyte material, on top of each other.

During the stacking procedure electrolyte material is placed between the adjacent sheets of electrolyte material to fill the space between the edges of the adjacent anode electrodes and to fill the spaces between the cathode electrodes and the apertures. For example layers of picture frames of electrolyte material are placed between the adjacent sheets of electrolyte material to fill the space between the edges of the adjacent anode electrodes and to fill the spaces between the cathode electrodes and the apertures.

A continuous layer of electrolyte material, or a compatible expansion matched insert material, is typically included as the uppermost layer of the stack so that the apertures, for supplying reactant to the sets of anode electrodes are closed and is separated from the cathode edges.

A similar holed layer of gas tight material is typically included at the bottom of the stack to ensure gas cannot escape at the edges of the lowest porous electrode layer. The layer of gas tight material may be one of the rectangular picture frames of electrolyte material, or where the substrate material or sealing gas is incompatible with the electrolyte material the layer of gas tight material may be a relatively inert expansion compatible barrier material such as stabilised zirconia material or magnesia magnesium aluminate (MMA).

If the sheets of electrolyte material with electrodes in the stack have already been fired, it may be necessary to coat the sheets of electrolyte material with un-sintered material, or a sinter aid, so that the sheets of electrolyte material actively sinter together on firing. However, if suitable binder systems are used it is beneficial to co-sinter the entire stack of electrolyte sheets only once.

The stack of sheets of electrolyte material is then divided into a plurality of green solid oxide fuel cells by cutting through the stack 120 in two perpendicular directions, in the case of rectangular, or square, solid oxide fuel cells. Thus the stack is cut in a first set of parallel planes X, with each plane X positioned mid way between the apertures 102 in the sheets of electrolyte material 100, and is cut in a second set of parallel planes Y, with each plane Y positioned mid way between the apertures 102 in the sheets of electrolyte material 100, and with the first set of planes X perpendicular to the second set of planes Y. These planes X and Y are arranged substantially perpendicular to the plane of the sheets of electrolyte material 100.

The green solid oxide fuel cells are then pressed if necessary and then fired at high temperature, for example 700° C. to 1500° C., so that the sheets of electrolyte material fuse to form gas tight seals around the electrodes and in particular the picture frames of electrolyte material fuse to the sheets of electrolyte material in the multilayer solid oxide fuel cells. However, it may be possible to dispense with the picture frames of electrolyte material if the number of sheets of electrolyte material is low to allow deformation of the sheets of electrolyte material to form the gas tight seals around the electrodes.

Further cathode electrode material is deposited onto the outer surface of each solid oxide fuel cell, by printing of a cathode electrode material or by repeated dipping into a suspension of a cathode electrode material with the orientation of the solid oxide fuel cell varied. Further anode electrode material is deposited onto the surface of the aperture of each solid oxide fuel cell by repeated dipping into a suspension of an anode electrode material. The additional electrode material is then dried and fired to complete the solid oxide fuel cells, such that the cathode electrode material on the outer surfaces of the solid oxide fuel cells electrically interconnects with the cathode electrodes between the layers of electrolyte material and such that the anode electrode material on the surfaces of the apertures electrically interconnects with the anode electrodes between the layers of electrolyte material.

The completed solid oxide fuel cells are then attached, and sealed, to a dense non-porous member, e.g. a substrate, such that the aperture in each solid oxide fuel cell is arranged with a corresponding aperture in the dense non-porous member. The solid oxide fuel cells are attached and sealed to the dense non-porous member using a suitable sealing material, for example a glass ceramic, to form a gas tight seal between the bottom of the solid oxide fuel cell and the dense non-porous member.

Electrical connections are made to the cathode material on the outer surfaces of the solid oxide fuel cells and to the anode material on the surfaces of the apertures of the solid oxide fuel cells, using wire, tape or thick film layers using known techniques.

Once a complete gas tight assembly has been produced, it may be necessary to heat to a high temperature, for example 300° C. to 900° C., and to supply the anode electrodes with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

In an alternative method of manufacturing the solid oxide fuel cells in which the oxidant is supplied to the apertures and the cathode electrodes are supplied with oxidant from the apertures, the cathode electrode material is deposited around each of the apertures, e.g. centred around each aperture, and extends a predetermined distance from each aperture, and thus the cathode electrode material is deposited at discrete separated positions. For example the cathode electrode material may be deposited in a rectangle, or square around a rectangular, or square, cross-section aperture. The anode electrode material is deposited such that it is spaced a predetermined distance from each of the apertures, but otherwise covers the whole of that surface of the sheet/plate of electrolyte material. For example the anode electrode material may be deposited as a sheet with rectangular, or square, shaped apertures with larger dimensions than rectangular, or square, shaped apertures in the sheet of electrolyte material.

A continuous layer of electrolyte material, or a compatible expansion matched insert material, is typically included as the uppermost layer of the stack so that the apertures, for supplying reactant to the sets of cathode electrodes are closed and is separated from the anode edges.

Further anode electrode material is deposited onto the outer surface of each solid oxide fuel cell, by printing of an anode electrode material or by repeated dipping into a suspension of an anode electrode material with the orientation of the solid oxide fuel cell varied. Further cathode electrode material is deposited onto the surface of the aperture of each solid oxide fuel cell by repeated dipping into a suspension of a cathode electrode material. The additional electrode material is then dried and fired to complete the solid oxide fuel cells, such that the anode electrode material on the outer surfaces of the solid oxide fuel cells electrically interconnects with the anode electrodes between the layers of electrolyte material and such that the cathode electrode material on the surfaces of the apertures electrically interconnects with the cathode electrodes between the layers of electrolyte material.

In alternative method of manufacturing the solid oxide fuel cells, the stack of sheets of electrolyte material is heated to a high temperature, for example 300° C. to 900° C., and the anode electrodes are supplied with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

Then the stack of sheets of electrolyte material is divided into a plurality of green solid oxide fuel cells by cutting through the stack in two perpendicular directions, in the case of rectangular, or square, solid oxide fuel cells. Thus the stack is cut in a first set of parallel planes, with each plane positioned mid way between the apertures in the sheets of electrolyte material, and is cut in a second set of parallel planes, with each plane positioned mid way between the apertures in the sheets of electrolyte material, and with the first set of planes perpendicular to the second set of planes. These planes are arranged substantially perpendicular to the plane of the sheets of electrolyte material.

In a further alternative method of manufacturing the solid oxide fuel cells it is possible to form one or more sheets of electrolyte material, form the apertures in the sheets of electrolyte material, deposit the anode electrode material and the electrode material on the surfaces of the sheets, cut the sheets in two perpendicular directions to form pieces with an aperture through each piece and stack the pieces on top of each other so that the apertures are aligned to form a green solid oxide fuel cell. These planes are arranged substantially perpendicular to the plane of the sheets of electrolyte material. Then green solid oxide fuel cells are heated to 300° C. to 900° C., and the anode electrodes are supplied with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

In all of the above mentioned methods it may be possible to deposit the anode electrode material and the cathode electrode material onto the surfaces of the sheets of electrolyte material in the predetermined patterns and then to form the apertures through the sheets of electrolyte material, either through the anode electrode material if the apertures supply fuel to the anode electrodes of the solid oxide fuel cells or through the cathode electrode material if the apertures supply oxidant to the cathode electrodes of the solid oxide fuel cells.

Although the sheets of electrolyte material have been cut into squares or rectangles, centred on the apertures through the sheets of electrolyte material it is equally possible to cut them into other suitable shapes for example triangles, hexagons, octagons etc centred on the apertures through the sheets of electrolyte material.

The invention claimed is:

1. A method of manufacturing a fuel cell, comprising:
    forming a plurality of sheets of electrolyte material,
    depositing anode electrode material on a first surface of each of the plurality of sheets of electrolyte material,
    depositing cathode material on a second surface of each of the plurality of sheets of electrolyte material,
    forming a plurality of apertures through each of the plurality of sheets of electrolyte material,
    arranging the plurality of sheets of electrolyte material in a stack such that the anode electrode material of adjacent sheets of electrolyte material face each other, the cathode electrode material of adjacent sheets of electrolyte material face each other, and the apertures in the plurality of sheets of electrolyte material are aligned,
    dividing the stack into a plurality of pieces such that an aperture extends into each of the plurality of pieces,
    depositing additional electrode material on the outer surfaces of each of the plurality of pieces, and
    depositing additional electrode material on the surface of the aperture of each of the plurality of pieces to form a fuel cell.

2. The method of manufacturing a fuel cell according to claim 1, wherein the step of forming the plurality of apertures through each of the plurality of sheets of electrolyte material is performed before the step of depositing the anode electrode material on the first surface of each of the plurality of sheets of electrolyte material.

3. The method of manufacturing a fuel cell according to claim 1, wherein the step of forming the plurality of apertures through each of the plurality sheets of electrolyte material is performed after the step of depositing the anode electrode material on the first surface of each of the plurality sheets of electrolyte material.

4. A method of manufacturing a fuel cell, comprising:
    forming at least one sheet of electrolyte material,
    depositing anode electrode material on a first surface of the at least one sheet of electrolyte material,
    depositing cathode material on a second surface of the at least one sheet of electrolyte material,
    forming a plurality of apertures through the at least one sheet of electrolyte material,
    dividing the at least one sheet of electrolyte material into a plurality of pieces such that an aperture extends through each of the plurality of pieces,
    arranging the plurality of pieces of electrolyte material in a stack such that the anode electrode material of adjacent pieces of the at least one sheet of electrolyte material face each other, the cathode electrode material of adjacent pieces of the at least one sheet of electrolyte material face each other, and the apertures in the adjacent pieces of the at least one sheet of electrolyte material are aligned,
    depositing further electrode material on the outer surfaces of each of the plurality of pieces, and
    depositing further electrode material on the surface of the aperture of each of the plurality of pieces to form a fuel cell.

5. The method of manufacturing a fuel cell according to claim 4, wherein the step of forming the plurality of apertures through the at least one sheet of electrolyte material is performed before the step of depositing the anode electrode material on the first surface of the least one sheet of electrolyte material.

6. The method of manufacturing a fuel cell according to claim 4, wherein the step of forming the plurality of apertures through the at least one sheet of electrolyte material is performed after the step of depositing the anode electrode material on the first surface of the least one sheet of electrolyte material.

* * * * *